United States Patent [19]
Nagano

[11] Patent Number: 5,330,220
[45] Date of Patent: Jul. 19, 1994

[54] APPARATUS FOR ROTATABLY FITTING A FORK STEM IN A HEAD TUBE OF A BICYCLE

[75] Inventor: Masashi Nagano, Izumi, Japan

[73] Assignee: Shimano Inc., Osaka, Japan

[21] Appl. No.: 968,920

[22] Filed: Oct. 30, 1992

[30] Foreign Application Priority Data

Nov. 5, 1991 [JP] Japan .................. 3-090294[U]

[51] Int. Cl.⁵ ............................................. B62K 21/06
[52] U.S. Cl. ................................................... 280/279
[58] Field of Search ....................... 280/279, 280, 276

[56] References Cited

U.S. PATENT DOCUMENTS

| | | | |
|---|---|---|---|
| 3,705,733 | 12/1972 | Koyama et al. | 280/279 |
| 4,189,167 | 2/1980 | Dubois | 280/279 |
| 4,303,257 | 12/1981 | Perotti et al. | 280/279 |
| 4,429,891 | 2/1984 | Hon | 280/279 |
| 4,445,703 | 5/1984 | Tange | 280/279 |
| 4,466,629 | 8/1984 | Sinyard | 280/279 |
| 4,545,594 | 10/1985 | Cabeza | 280/279 |
| 4,593,924 | 6/1986 | Cabeza | 280/279 |
| 5,163,758 | 11/1992 | Chi | 280/279 |

FOREIGN PATENT DOCUMENTS

| | | | |
|---|---|---|---|
| 1415 | 4/1926 | Australia | 280/279 |
| 73378/74 | 7/1978 | Australia . | |
| 145297 | 5/1902 | Denmark . | |
| 8816354.7 | 4/1989 | Fed. Rep. of Germany . | |
| 398223 | 5/1909 | France . | |
| 561703 | 2/1925 | France . | |
| 2374204 | 7/1978 | France . | |

Primary Examiner—Margaret A. Focarino
Assistant Examiner—Kevin Hurley
Attorney, Agent, or Firm—Dickstein, Shapiro & Morin

[57] ABSTRACT

An apparatus for rotatably fitting a fork stem (4) in a head tube (5) of a bicycle. This apparatus has a first race element (1) fitted on the fork stem, and a second race element (2) opposed to the first race element and inserted into an annular space defined between the fork stem and the head tube. The first race element (1) defines a first contact surface (1b). A first ring element (7) defining a first rolling body supporting surface (7b) is fitted on the first race element (1). The second race element (2) defines a second contact surface (2b). A second ring element (8) defining a second rolling body supporting surface (8b) is fitted on the second race element (2). The first contact surface (1b) is shaped to have a component of reaction force acting radially inwardly of the fork stem from the first ring element to the first race element when rolling bodies (6) are clamped between the first supporting surface and second supporting surface. The second contact surface (2b) is shaped to have a component of reaction force acting radially outwardly of the head tube from the second ring element to the second race element when the rolling bodies (6) are clamped between the second supporting surface and second supporting surface.

6 Claims, 4 Drawing Sheets

APPARATUS FOR ROTATABLY FITTING A FORK STEM IN A HEAD TUBE OF A BICYCLE

BACKGROUND OF THE INVENTION

1. Field of the Invention

The present invention relates to an apparatus, generally called head parts, for rotatably fitting a fork stem in a head tube of a bicycle. This apparatus comprises a first race element fitted on the fork stem, a second race element inserted into an annular space formed between the fork stem and head tube to be opposed to the first race element, and balls arranged between the first and second race elements.

2. Description of the Related Art

In conventional head parts, as shown in FIG. 5, a first race element 1 and a second race element 2 define ball supporting surfaces 1a and 2a, respectively, for supporting balls 6 to perform a bearing function.

With such a conventional construction, a head structure may be formed by the ball supporting surfaces of the first and second race elements and balls assembled together with inadequate precision, such as with a misalignment between the two ball supporting surfaces. This happens when the individual parts are manufactured or assembled with considerable errors, or errors of these parts accumulate to a large amount. As a result, the entire head part assembly has a low quality and low working efficiency.

SUMMARY OF THE INVENTION

The object of the present invention is to provide head parts which may be assembled efficiently and with high precision to form a head structure, and may be assembled firmly by making use of reaction forces occurring when rolling bodies are clamped with two race elements.

The above object is fulfilled, according to the present invention, by an apparatus comprising a first race element defining a first contact surface, a first ring element fitted on the first race element through contact with the first contact surface, the first ring element defining a first rolling body supporting surface facing radially outwardly, a second race element defining a second contact surface, and a second ring element fitted on the second race element through contact with the second contact surface, the second ring element defining a second rolling body supporting surface facing radially inwardly. The first contact surface is shaped to have a component of reaction force acting radially inwardly of the fork stem from the first ring element to the first race element when the first race element and the second race element are moved relative to each other to clamp rolling bodies between the first supporting surface and the second supporting surface. The second contact surface is shaped to have a component of reaction force acting radially outwardly of the head tube from the second ring element to the second race element when the first race element and the second race element are moved relative to each other to clamp the rolling bodies between the first supporting surface and the second supporting surface.

This construction provides the following functions and effects.

The first ring element and second ring element defining the rolling body supporting surfaces, respectively, are formed separately from the first race element and second race element. It is therefore possible to provide assembling adaptability between the first race element and first ring element and between the second race element and second ring element. According to the prior art, the head parts may be assembled improperly to cause malfunctions of the rolling bodies in the event of a misalignment between the first race element secured to the fork stem and the second race element secured to the head tube. With the head parts of the present invention, a misalignment between the first race element and second race element is absorbed by conditions in which the first ring element is attached to the first race element and the second ring element to the second race element. There occurs little or no misalignment between the rolling body supporting surface of the first ring element attached to the first race element and the rolling body supporting surface of the second ring element attached to the second race element. Consequently, the head parts are assembled in a way to allow these elements to perform an excellent bearing function.

When the head parts are assembled in a predetermined condition with the rolling bodies clamped by the first race element and second race element under a predetermined pressure, a horizontal component of clamping reaction force is applied from the first ring element to the first race element in a direction to compress the first race element. This horizontal component counters an attachment reaction or the like tending to weaken a strength with which the first race element is attached to the fork stem. On the other hand, a horizontal component of clamping reaction force is applied from the second ring element to the second race element in a direction to expand the second race element. This horizontal component counters an attachment reaction or the like tending to weaken a strength with which the second race element is attached to the head tube.

In a preferred embodiment of the present invention, seal elements are mounted between the first ring element and second ring element to prevent entry of foreign matters to an accommodating space for the rolling bodies.

According to this construction, even if rain water or muddy water enters the first race element or second race element, the seal elements are effective to block its inflow to the rolling bodies. Thus, regions of contact between the rolling bodies and ring elements are protected from wear and damage due to intrusion of foreign matters.

In a further preferred embodiment of the invention, a retainer is provided for preventing detachment of the first ring element and second ring element. With this construction, the first ring element and second ring element may be handled as a unit to promote efficiency of a head part assembling operation. This retainer may simply be in the form of a stopper ring to restrict movement of the rolling bodies arranged between the first supporting surface and second supporting surface.

Other features and advantages of the present invention will be apparent from the following description of the preferred embodiment taken with reference to the drawings.

DETAILED DESCRIPTION OF THE PREFERRED EMBODIMENT

Figure 1:
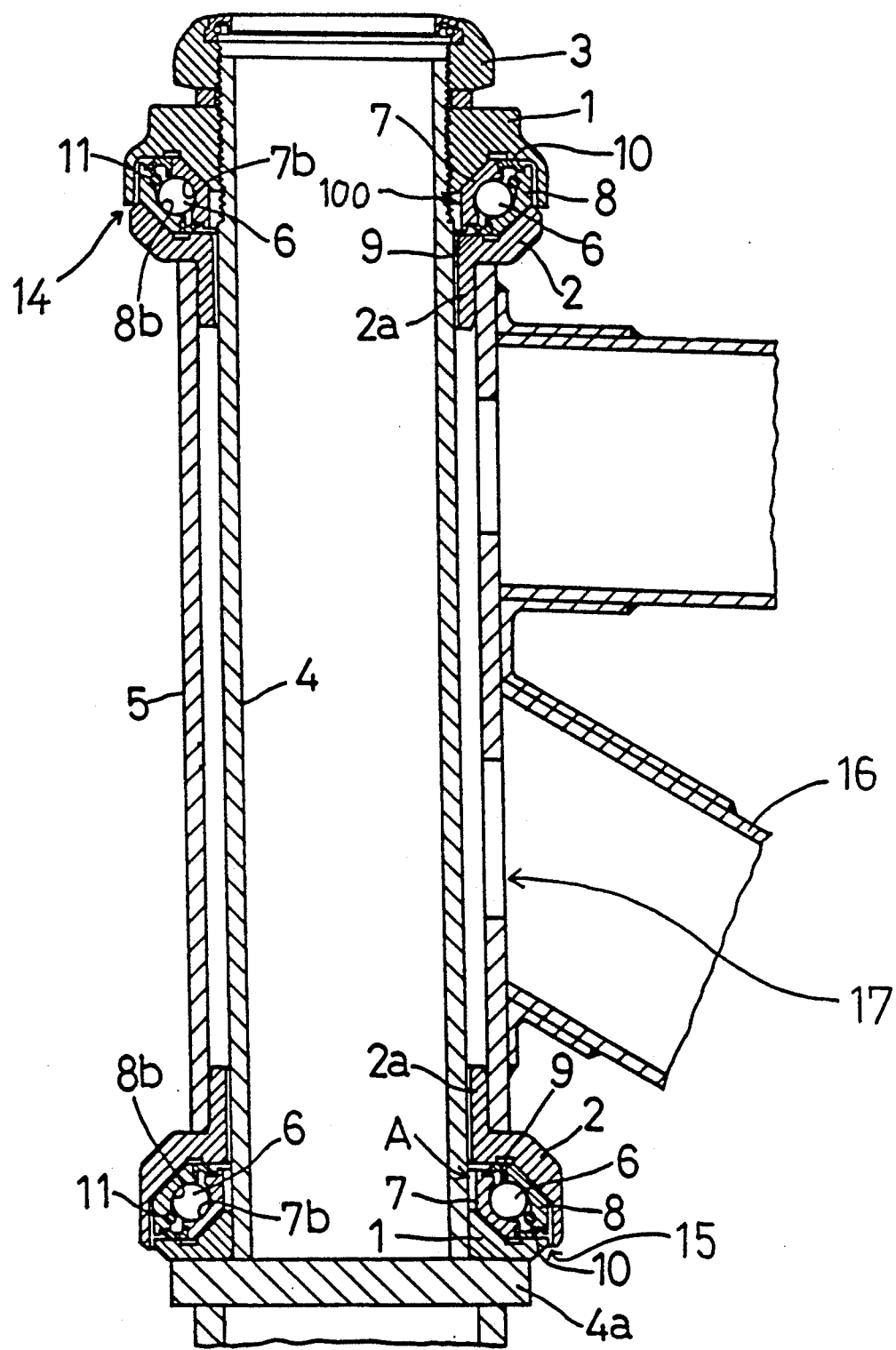
FIG. 1 is a sectional view of head parts of a bicycle in an assembled state.
Figure 2:
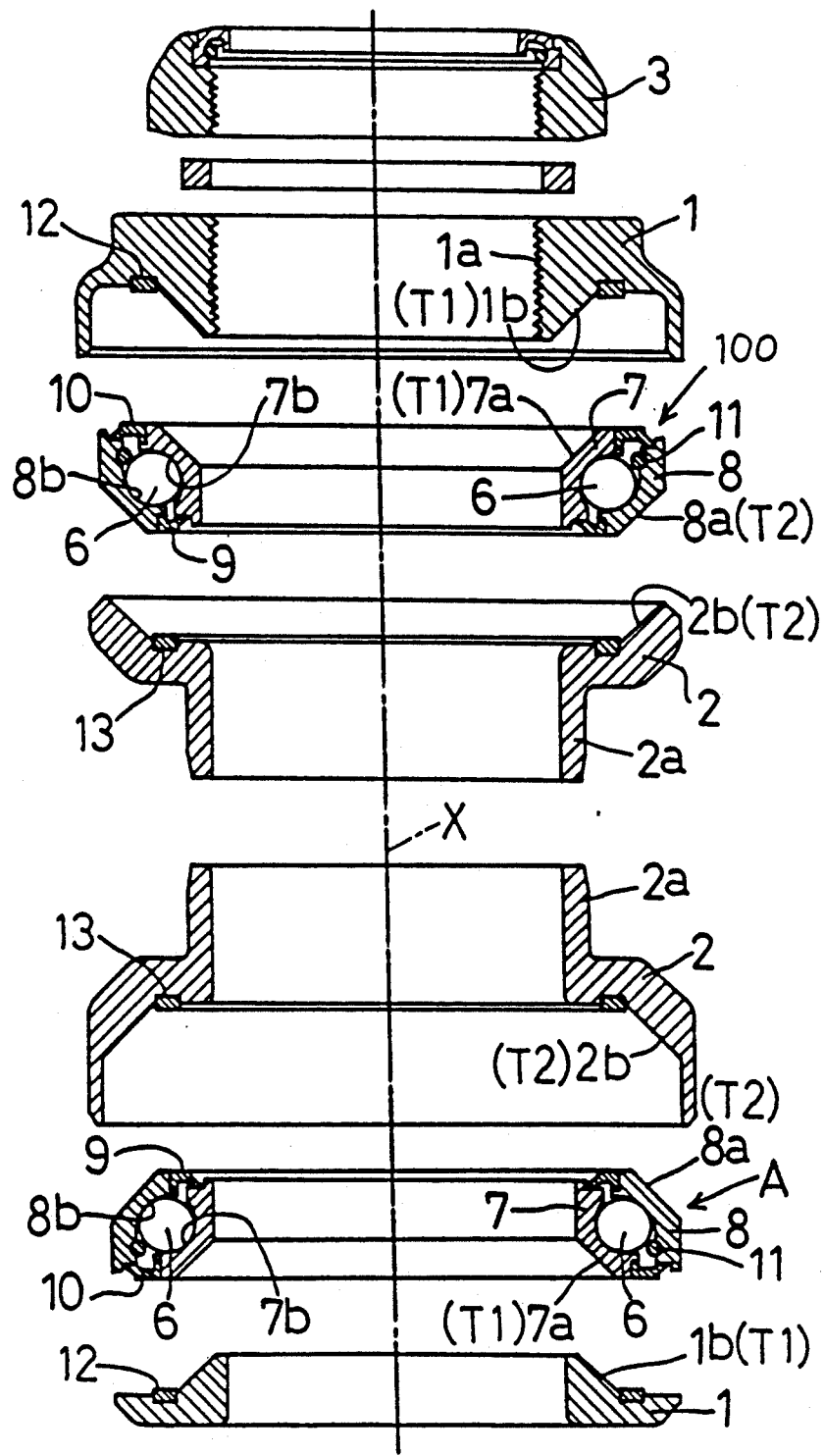
FIG. 2 is an exploded sectional view of the head parts.

FIGS. 1 and 2 show apparatus for rotatably fitting a fork stem 4 in a head tube 5 of a bicycle. As shown in FIG. 1, two such apparatus are provided, one in an upper position and the other in a lower position. Each apparatus includes a first race element 1 formed of aluminum, a second race element 2 also formed of aluminum, and a bearing unit 100. The bearing unit 100 has a first ring element 7, a second ring element 8, and balls 6 arranged between the ring elements 7 and 8. After the fork stem 4 is inserted into the head tube 5, these parts with the bearing unit 100 lying in the middle are clamped by a lock nut 3. Consequently, as shown in FIG. 1, a head structure of the bicycle is formed with the fork stem 4 mounted to be rotatable relative to the head tube 5 of a body frame.

This bicycle head structure will be described in greater detail now. As shown in FIG. 1, the first race element 1 in the lower apparatus is fitted on a lower end of the fork stem 4 to rest on a front wheel supporting fork 4a continuous with the fork stem 4. Thus, the first race element 1 is secured in place relative to the fork stem 4.

The second race element 2 in each of the upper and lower apparatus includes a mounting tube 2a formed to fit in the head tube 5. This mounting tube 2a is press fit in an upper or lower end of the head tube 5 to secure the second race element 2 to the head tube 5.

The first race element 1 in the upper apparatus defines a mounting screw 1a for meshing with an outer surface in an upper end region of fork stem 4. Each of the upper and lower bearing units 100 is pressed by the second race element 2 with a predetermined pressure to be held in place relative to the fork stem 4. The lock nut 3 is screwed to an upper end of the fork stem 4 to press down the upper first race element 1.

Each bearing unit 100, more specifically, includes a predetermined number of balls 6, a first steel ring element 7, a second steel ring element 8, a seal element 9 for protecting the balls 6 against entry of foreign matters from inner peripheries of the race elements 1 and 2, and a seal element 10 for protecting the balls 6 against entry of foreign matters from outer peripheries of the race elements 1 and 2. The bearing unit 100 is held under a predetermined pressure between the first and second race elements 1 and 2 by a clamping force applied through the upper first race element 1. In this state, the first ring element 7 engages with the first race element 1 in a stable manner through an interaction between a contact surface 1b of the first race element 1 and a contact surface 7a of the first ring element 7 and through a wedging action of the contact surface 1b applied to the first ring element 7. The wedging action is produced since the contact surface 1b is a conical surface inclined relative to a rotational axis X of the race elements. Consequently, the first race element 1 supports the balls 6 through a ball supporting surface 7b contacting the balls 6. The second ring element 8 engages with the second race element 2 in a stable manner through an interaction between a support surface 2b of the second race element 2 and a contact surface 8a of the second ring element 8 and through a wedging action of the support surface 2b applied to the second ring element 8. This wedging action is produced since the support surface 2b is a conical surface inclined relative to the rotational axis X of the race elements. Consequently, the second race element 2 supports the balls 6 through a ball supporting surface 8b contacting the balls 6. When the bearing unit 100 is released from the sandwiched state between the first and second race elements 1 and 2, the ring elements 7 and 8 are detachable from the first and second race elements 1 and 2.

The second ring element 8 has a stopper ring 11 in contact with the balls 6. This allows the balls 6, ring elements 7 and 8 and seal elements 9 and 10 constituting the bearing unit 100 to be assembled to and disassembled from the race elements 1 and 2 all together as a single unit. That is, the stopper ring 11 acts as a stopper to retain the balls 6 in place, so that the balls 6 cannot disengage from the ball supporting surfaces 7b and 8b of the ring elements 7 and 8. Consequently, the ring elements 7 and 8 remain connected to each other through the balls 6. The seal elements 9 and 10 are supported by the ring element 7 or 8. According to this construction, even when the first and second ring elements 7 and 8 are detached from the race elements 1 and 2, the bearing unit 100 is maintained in the assembled state, with the ring elements 7 and 8 rotatable relative to each other and the seal elements 9 and 10 retained in place, as long as the balls 6 lie between the ball supporting surfaces 7b and 8b of the ring elements 7 and 8.

Thus, the bearing unit 100 is disposed between the first race element 1 and second race element 2, with the ring elements 7 and 8 sandwiched under a predetermined pressure between the contact surfaces 1b and 2b of the first and second race elements 1 and 2. This realizes a head part mounting state in which the bearing unit 100 is connected to the fork stem 4 through the first race element 1 and to the head tube 5 through the second race element 2. In this state, the first race element 1 and first ring element 7 constitute an inner race structure secured to the fork stem 4 and having the ball supporting surface 7b. The second race element 2 and second ring element 8 constitute an outer race structure secured to the head tube 5 and having the ball supporting surface 8b. These structures in combination form each apparatus for rotatably fitting the fork stem 4 in the head tube 5.

The seal elements 9 and 10 will be described in detail next.

Figure 3:
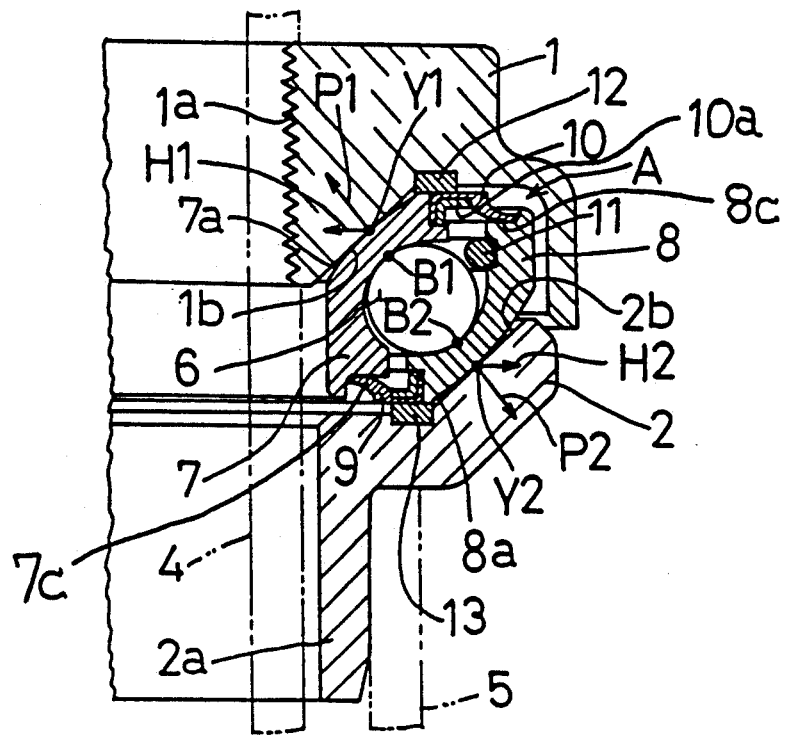
FIG. 3 is a sectional view of a bearing unit.
Figure 4:
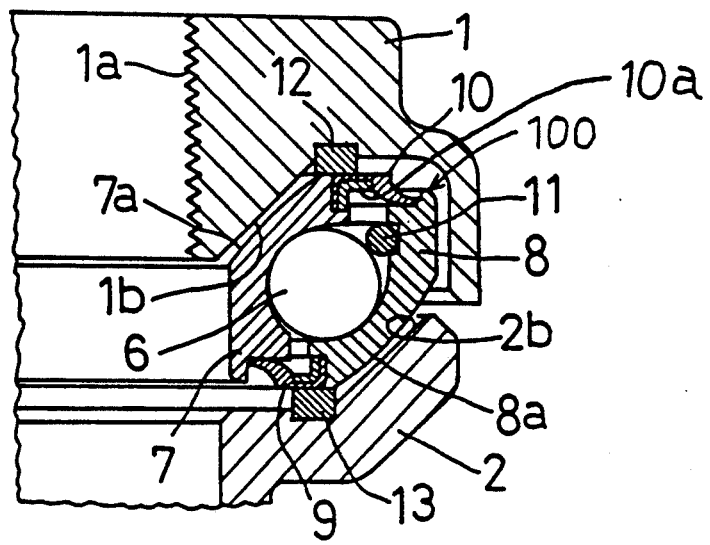
FIG. 4 is a sectional view showing elastic elements in an operative state.
Figure 5:
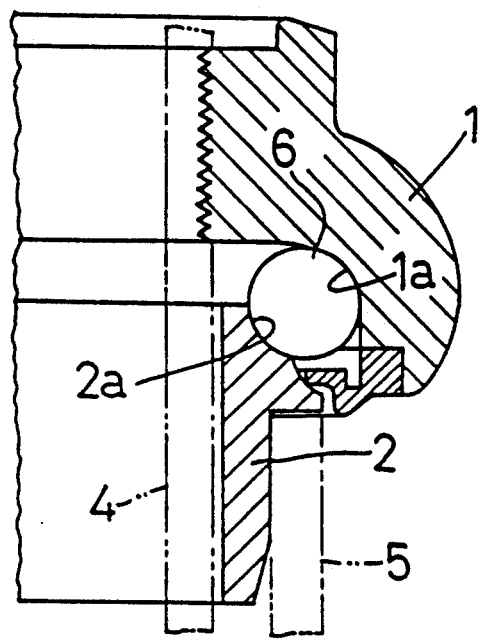
FIG. 5 is a sectional view of conventional head parts.

As shown in FIGS. 3 and 4, the seal element 10 includes a rubber seal body, and a metal ring 10a for providing sealing strength and shape retention. The seal element 9 also includes a rubber seal body, and a metal ring for providing sealing strength and shape retention. The seal elements 9 and 10 are shaped to stop access to the balls 6 of foreign matters from inner and outer peripheries of the first and second race elements 1 and 2.

When the bearing unit 100 is in a predetermined assembled state, one of the seal elements 9 lies between the ring elements 7 and 8 and between the balls 6 and the inner peripheries of the race elements 1 and 2, while the other seal element 10 lies between the ring elements 7 and 8 and between the balls 6 and the outer peripheries of the race elements 1 and 2. Rain water or muddy water may flow down the fork stem 4 to the inner peripheries of the race elements 1 and 2. Such water may enter a bottom bracket (not shown) of the body frame, and flow into the head tube 5 through a downtube 16 and a gas vent hole 17 of the head tube 5 as shown in FIG. 1, when the bicycle is turned upside down. In such cases, the seal element 9 prevents the water from flowing to the balls 6. Rain water and muddy water may flow from the outer peripheries of the race elements 1 and 2 into the space between the race elements 1 and 2. The seal element 10 prevents this water from reaching the balls 6.

As shown in FIG. 3, the ring elements 7 and 8 include substantially horizontal seal receiving surfaces 7c and 8c for contacting the seal elements 9 and 10, respectively. The first and second race elements 1 and 2 are clamped together in the direction along the rotational axis, and are therefore displaceable relative to each other more easily in directions perpendicular to the rotational axis than in the direction along the rotational axis. In spite of such a relative displacement, the seal elements 9 and 10 remain in contact with the ring elements 7 and 8 under a substantially constant pressure.

The bearing unit accommodating space between the first race element 1 and second race element 2 has an opening 14 or 15 communicating with the ambient. A direction of this opening 14 or 15 may be selected or a positional relationship between the opening 14 or 15 and the seal element 10 may be selected such that a curved or relatively long passage is formed therebetween. Such a passage provides an advantage of not readily allowing rain water or muddy water entering through the opening 14 or 15 to reach the seal element 10. Even if the water reaches the seal element 10, it will not easily flow to the balls 6 because of decompression.

As shown in FIG. 3, the first contact surface 1b of the first race element 1 defines a conical surface inclined with respect to the rotational axis X of the fork stem 4. Consequently, when the first race element 1 and second race element 2 clamp the balls 6 in the direction along the rotational axis X, the first ring element 7 imparts a clamping reaction P1 to the first race element 1, acting inwardly of the fork stem 4. As shown in FIG. 3, the second contact surface 2b of the second race element 2 defines a conical surface inclined with respect to the rotational axis X of the fork stem 4. Consequently, when the first race element 1 and second race element 2 clamp the balls 6 in the direction along the rotational axis X, the second ring element 8 imparts a clamping reaction P2 to the second race element 2, acting outwardly of the head tube 5. Thus, the clamping force applied to clamp the balls 6 with the race elements 1 and 2 under a predetermined pressure is effectively utilized to uphold the strength with which the first race element 1 is attached to the fork stem 4 and the second race element 2 to the head tube 5.

That is, when the lock nut 3 is tightened to clamp the balls 6 with the race elements 1 and 2 under a predetermined pressure to provide a properly assembled condition, the clamping reaction P1 is applied from the first ring element 7 to the first race element 1, and the clamping reaction P2 from the second ring element 8 to the second race element 2. The clamping reaction P1 has a horizontal component of force H1 acting in a direction to compress the first race element 1. This component of force H1 maintains the first race element 1 securely attached to the fork stem 4 by countering an attachment reaction and the like. The clamping reaction P2 has a horizontal component of force H2 acting in a direction to expand the second race element 2. This component of force H2 maintains the second race element 2 securely attached to the head tube 5 by countering an attachment reaction and the like.

The contact surface 7a of the first ring element 7 and the contact surface 8a of the second ring element 8 are curved to bulge toward the first contact surface 1b of the first race element 1 and the supporting surface 2b of the second race element 2, respectively. This configuration places the bearing unit 100 in a posture to allow a smooth operation of the balls 6.

Specifically, as shown in FIG. 3, when the clamping force is applied from the race elements 1 and 2 to the bearing unit 100, each ball 6 contacts the first ring element 7 at a point of application B1 and the second ring element 8 at a point of application B2. A clamping reaction is applied from each ball 6 to the first ring element 7 at the point of application B1 and to the second ring element 8 at the point of application B2. Further, since the contact surfaces 7a and 8a are curved surfaces, the first ring element 7 contacts the first race element 1 at a point of application Y1, and the second ring element 8 contacts the second race element 2 at a point of application Y2. The points of application B1, B2, Y1 and Y2 lie substantially on a straight line. Consequently, the first race element 1 and second race element 2 are assembled to be rotatable relative to each other through the balls 6 smoothly without a twist. For this purpose, the above relationship may be conversed so that the contact surfaces 7a and 8a of the ring elements 7 and 8 are conical surfaces to engage curved supporting surfaces 1a and 2a of the race elements 1 and 2.

Numerals 12 and 13 in FIGS. 2 through 4 denote elastic elements acting to maintain the bearing unit 100 in a proper posture between the race elements 1 and 2. As shown in FIG. 4, the elastic elements 12 and 13 are not deformed when the bearing unit 100 is just placed and not yet clamped between the race elements 1 and 2. In this state, the elastic elements 12 and 13 support the bearing unit 100 such that the contact surfaces 7a and 8a of the ring elements 7 and 8 are out of contact with the first contact surfaces 1b and 2b of the race elements 1 and 2. When the bearing unit 100 is clamped under the predetermined pressure, the elastic elements 12 and 13 are deformed to fit into receiving recesses of the race elements 1 and 2. As a result, the ring elements 7 and 8 are allowed to contact the first contact surfaces 1b and 2b of the race elements 1 and 2, whereby the bearing unit 100 is supported in the properly assembled posture. As noted above, the ring elements 7 and 8 are maintained out of contact with the race elements 1 and 2 before the bearing unit 100 is clamped under the predetermined pressure. This step is taken in order to avoid a situation where the ring elements 7 and 8 contact the race elements 1 and 2 while the bearing unit 100 remains in an improper posture. Otherwise, the bearing unit 100 could be clamped in the improper posture as supported by the race elements 1 and 2.

In the foregoing embodiment, the second ring element 8 defining the ball supporting surface 8b is formed separately from the second race element 2. This is advantageous in that, while the ball supporting surface 8b may be formed of a steel material having excellent wear resistance and pressure resistance, the second race element 2 may be formed of an aluminum material having excellent flexibility to be free from deformation and cracking when press fitting to the fork stem 4.

The present invention is not limited to the foregoing embodiment, but may be modified in various ways as follows.

The balls 6 may be replaced with rollers or other rolling bodies having varied shapes.

The stopper ring 11 may be replaced with various other connecting means such as an element extending from one of the ring elements 7 and 8 to the other and slidably engaging the latter, thereby relatively rotatably interconnecting the ring elements 7 and 8 to form a unit. Such means are collectively called herein retainer means 11.

Aside from assembling the fork stem 4 and head tube 5, the present invention is applicable to various assemblies of bicycle parts, e.g. to a connection between a hub and a hub shaft, between a pedal and a pedal shaft, or between a crank shaft and a bottom bracket. In such cases, the fork stem 4 may be regarded as an inner part and the head tube 5 as an outer part.

As in the foregoing embodiment, the first race element 1 and second race element 2 may be formed separately from the inner part and outer part to act as intermediate elements for attaching the first ring element 7 to the inner part and the second race element 2 to the outer part, respectively. It is also possible to integrate each of these intermediate elements with the inner part or outer part.

What is claimed is:

1. An apparatus for rotatably fitting a fork stem in a head tube of a bicycle, comprising:
    first race means including a first race element fitted on said fork stem and defining a first contact surface, and a first ring element fitted on said first race element through contact with said first contact surface, said first ring element defining a first supporting surface facing radially outwardly;
    second race means opposed to said first race means axially of said fork stem, said second race means including a second race element inserted into an annular space defined between said fork stem and said head tube, said second race element defining a second contact surface, and a second ring element fitted on said second race element through contact with said second contact surface, said second ring element defining a second supporting surface facing radially inwardly;
    rolling bodies arranged between said first supporting surface and said second supporting surface; and
    retaining means provided on said second ring element for holding said first and second ring elements and said rolling bodies as one unit;
    wherein said first contact surface is shaped to have a component of reaction force acting radially inwardly of said fork stem from said first ring element to said first race element when said first race element and said second race element are moved relative to each other to clamp said rolling bodies between said first supporting surface and said second supporting surface, and
    said second contact surface is shaped to have a component of reaction force acting radially outwardly of said head tube from said second ring element to said second race element when said first race element and said second race element are moved relative to each other to clamp said rolling bodies between said first supporting surface and said second supporting surface.

2. An apparatus as defined in claim 1, wherein said first and second contact surfaces are inclined surfaces.

3. An apparatus as defined in claim 1, wherein said rolling bodies are balls.

4. An apparatus as defined in claim 1, further comprising seal means mounted between said first ring element and said second ring element to prevent entry of foreign matters to an accommodating space for said rolling bodies.

5. An apparatus as defined in claim 2, wherein said first and second contact surfaces are in contact with convexed surfaces of said ring elements, respectively.

6. An apparatus as defined in claim 1, wherein said retainer means comprises a stopper ring to restrict movement of said rolling bodies arranged between said first supporting surface and said second supporting surface.

* * * * *